(12) United States Patent
Chan et al.

(10) Patent No.: US 8,446,172 B2
(45) Date of Patent: May 21, 2013

(54) APPARATUS AND METHODS OF REDUCING PRE-EMPHASIS VOLTAGE JITTER

(75) Inventors: Allen Chan, San Jose, CA (US); Wilson Wong, San Francisco, CA (US)

(73) Assignee: Altera Corporation, San Jose, CA (US)

( * ) Notice: Subject to any disclaimer, the term of this patent is extended or adjusted under 35 U.S.C. 154(b) by 130 days.

(21) Appl. No.: 13/102,918

(22) Filed: May 6, 2011

(65) Prior Publication Data

US 2012/0280724 A1 Nov. 8, 2012

(51) Int. Cl.
*H03K 19/0175* (2006.01)
(52) U.S. Cl.
USPC ............... 326/86; 326/26; 326/82; 326/27; 327/108; 327/112
(58) Field of Classification Search
USPC ............... 326/83, 86, 26, 27; 327/108–112, 327/540; 375/229, 257, 121, 295
See application file for complete search history.

(56) References Cited

U.S. PATENT DOCUMENTS

| | | | |
|---|---|---|---|
| 5,969,545 A | 10/1999 | Assadian et al. | |
| 6,603,348 B1 | 8/2003 | Preuss et al. | |
| 6,900,663 B1 | 5/2005 | Roper et al. | |
| 6,937,054 B2 * | 8/2005 | Hsu et al. | 326/30 |
| 6,977,534 B2 * | 12/2005 | Radelinow | 327/112 |
| 7,038,502 B2 | 5/2006 | Yamaguchi | |
| 7,053,712 B2 | 5/2006 | Bonacio et al. | |
| 7,514,968 B1 * | 4/2009 | Lai et al. | 327/108 |
| 7,557,602 B2 * | 7/2009 | Kim et al. | 326/26 |
| 7,590,174 B2 * | 9/2009 | Wong et al. | 375/229 |
| 7,830,167 B2 * | 11/2010 | Ono et al. | 326/27 |
| 8,014,680 B2 * | 9/2011 | Lee et al. | 398/136 |

* cited by examiner

*Primary Examiner* — Vibol Tan
(74) *Attorney, Agent, or Firm* — Okamoto & Benedicto LLP (57) ABSTRACT

One embodiment relates to a method of driving a transmission signal with pre-emphasis having minimal voltage jitter. A digital data signal is received, and a pre-emphasis signal is generated. The pre-emphasis signal may be a phase shifted and scaled version of the digital data signal. An output signal is generated by adding the pre-emphasis signal to the digital data signal within a driver switch circuit while low-pass filtering is applied to current sources of the driver switch circuit. Other embodiments, aspects, and features are also disclosed.

18 Claims, 11 Drawing Sheets

APPARATUS AND METHODS OF REDUCING PRE-EMPHASIS VOLTAGE JITTER

BACKGROUND

1. Technical Field

The present invention relates generally to electrical circuits. More particularly, the present invention relates to reducing voltage jitter in data transmission.

2. Description of the Background Art

Serial links may be used to communicate between devices in a system. Typically, it is the intention for the transmitter in such a system to transmit a digital (binary) signal having two distinctive levels and well-defined (i.e., very steep) transitions from either of these levels to the other level. However, the medium that conveys the signal from the transmitter to the receiver usually imposes losses on the signal being transmitted. These losses generally include diminished signal amplitude and reduced transition steepness.

To maintain accurate, high-speed data transmission, it is necessary for the circuitry to compensate for these losses. One compensation technique is to use what is called pre-emphasis at the transmitter. Another compensation technique is to perform equalization at the receiver.

It is highly desirable to improve transceiver circuits for high-speed serial interfaces and other applications.

SUMMARY

One embodiment relates to a method of driving a transmission signal with pre-emphasis having minimal voltage jitter. A digital data signal is received, and a pre-emphasis signal is generated. The pre-emphasis signal may be a phase shifted and scaled version of the digital data signal. An output signal is generated by adding the pre-emphasis signal to the digital data signal within a driver switch circuit while low-pass filtering is applied to current sources of the driver switch circuit.

Another embodiment relates to a transmitter circuit which includes a plurality of current sources, a plurality of filters, and a driver switch circuit. A first filter is coupled between a first current source and a first node, and a second filter is coupled between the first current source and a second node. A third filter is coupled between the second current source and a third node, and a fourth filter is coupled between the second current source and a fourth node. A driver switch circuit coupled to the first, second, third and fourth nodes. The driver switch circuit may include a main driver circuit connected to the first and third nodes and a pre-emphasis driver circuit connected to the second and fourth nodes.

Another embodiment relates to an integrated circuit. The integrated circuit includes a transmitter which is configured to receive a digital data signal and generate a pre-emphasis signal which is a phase shifted and scaled version of the digital data signal. A driver switch circuit for the transmitter is configured to add the pre-emphasis signal to the digital data signal so as to generate an output signal. In addition, a plurality of low-pass filters are advantageously connected between current sources and the driver switch.

Other embodiments, aspects and features are also disclosed.

DETAILED DESCRIPTION

As data rates and bandwidth requirements of serial links continue to increase, so does the demand and complexity placed on transceiver designs to deliver solutions to maximize the signal integrity between integrated circuits (ICs).

As mentioned above, pre-emphasis is one technique to minimize the effects of high-frequency losses caused by the channel medium. Pre-emphasis typically boosts the high frequencies in the transmit data signal since the high-frequency signal components generally suffer greater attenuation as the signal is transmitted over the medium. However, as described further below, applicants have determined that the variation in frequency response caused by the pre-emphasis results in data-dependent jitter and other inter symbol interference (ISI) effects.

The present disclosure describes a technique used to effectively suppress pre-emphasis voltage noise in a high-speed transceiver. The technique also helps to prevent the driver switches from hitting an overstress condition by suppressing voltage spikes on the current source (Vtp and Vtn) nodes. The suppression of the voltage noise is accomplished by filtering the modulation on the current source nodes. A low pass (RC) filter may be inserted between the nodes and the current sources to attenuate the high-frequency modulation.

Embodiments disclosed herein provide numerous benefits and advantages. First, the amount of voltage variations on the output of the transmitter driver is reduced when pre-emphasis is enable for high data rates. Second, performance of the high-speed transmitter buffer is increased. Third, the signal integrity of the transmitter buffer at high data rates is improved by reducing inter-symbol interference caused by data-dependent jitter. Fourth, by minimizing voltage spikes, the driver switches are less likely to enter overstress conditions. Fifth, data-dependent voltage modulation is suppressed.

Figure 1:
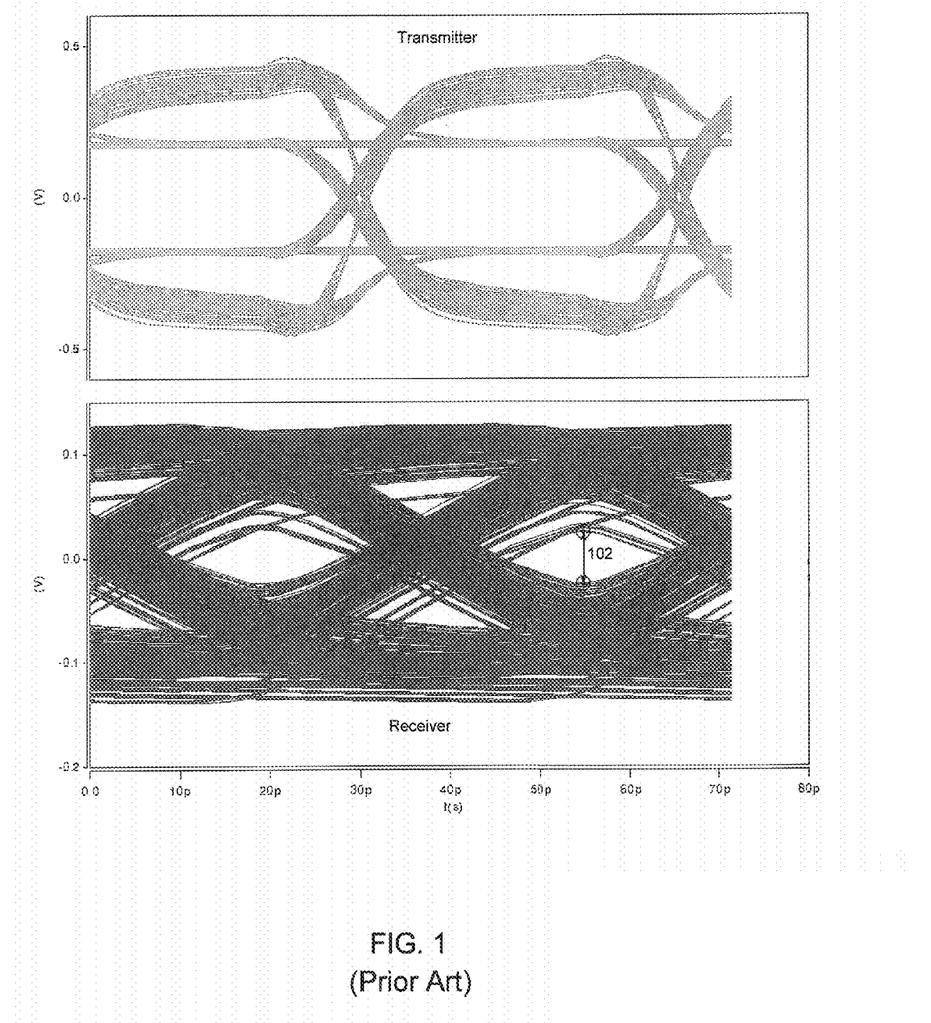
FIG. 1 shows transient eye diagrams for a conventional transmitter and receiver.

FIG. 1 shows transient eye diagrams for a conventional transmitter and receiver. The transient eye diagram for the transmitter is shown at the top, and the transient eye diagram for the receiver is shown at the bottom.

The eye diagram for the transmitter shows relatively large voltage jitter in the superimposed transitions. Applicants have determined that voltage jitter is caused, in large part, by data-dependent pre-emphasis variations. The corresponding eye diagram for the receiver shows a relatively small eye opening 102. The small eye opening is a result of the large voltage jitter at the transmitter.

Figure 2:
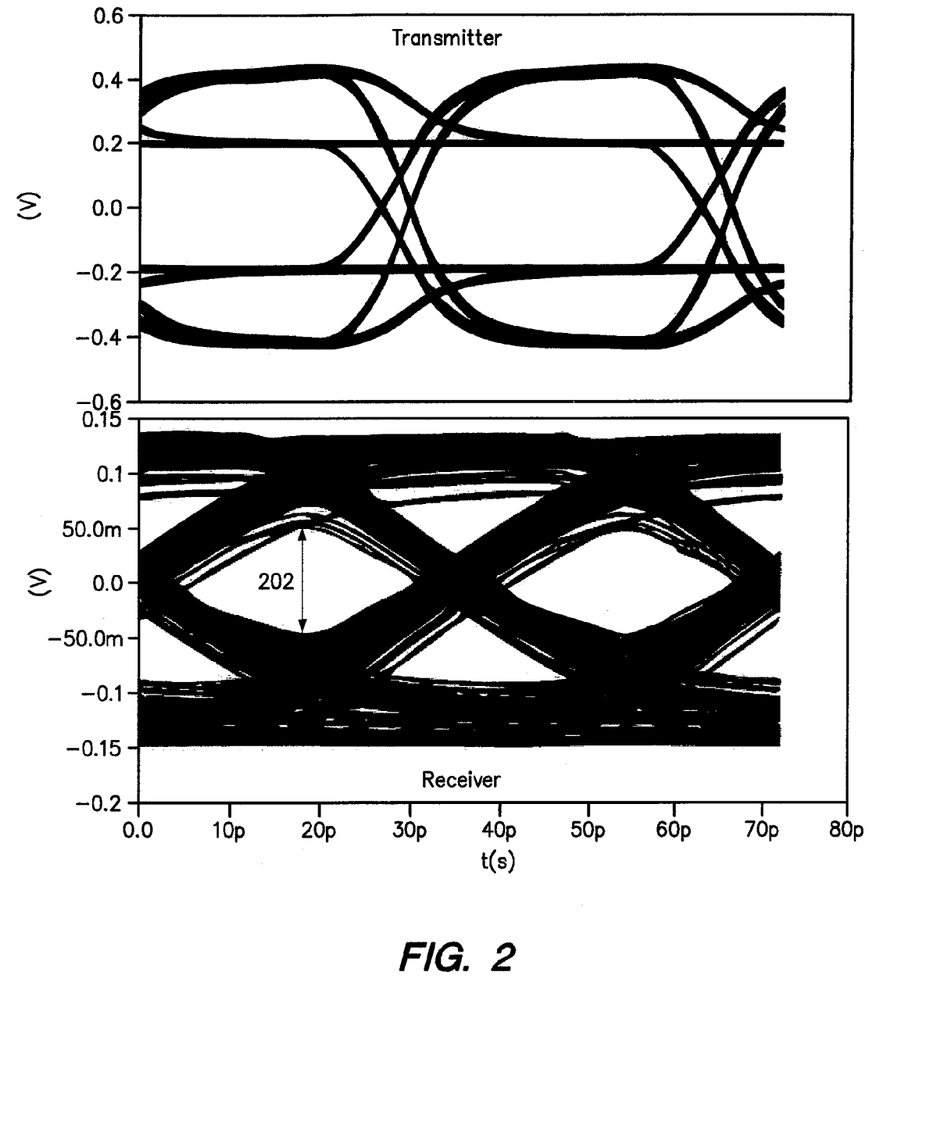
FIG. 2 shows transient eye diagrams for a transmitter and receiver with reduced voltage jitter in accordance with an embodiment of the invention.

FIG. 2 shows transient eye diagrams for a transmitter and receiver with reduced voltage jitter in accordance with an embodiment of the invention. As in FIG. 1, the transient eye diagram for the transmitter is shown at the top, and the transient eye diagram for the receiver is shown at the bottom.

The eye diagram for the transmitter in FIG. 2 shows substantially less voltage jitter in the superimposed transitions compared with the corresponding eye diagram in FIG. 1. As described further below, the reduction in voltage jitter is due to a dampening of data-dependent pre-emphasis variations in accordance with an embodiment of the invention. The corresponding eye diagram for the receiver shows a relatively large eye opening 202. The larger eye opening is a result of the smaller voltage jitter at the transmitter.

Figure 3:
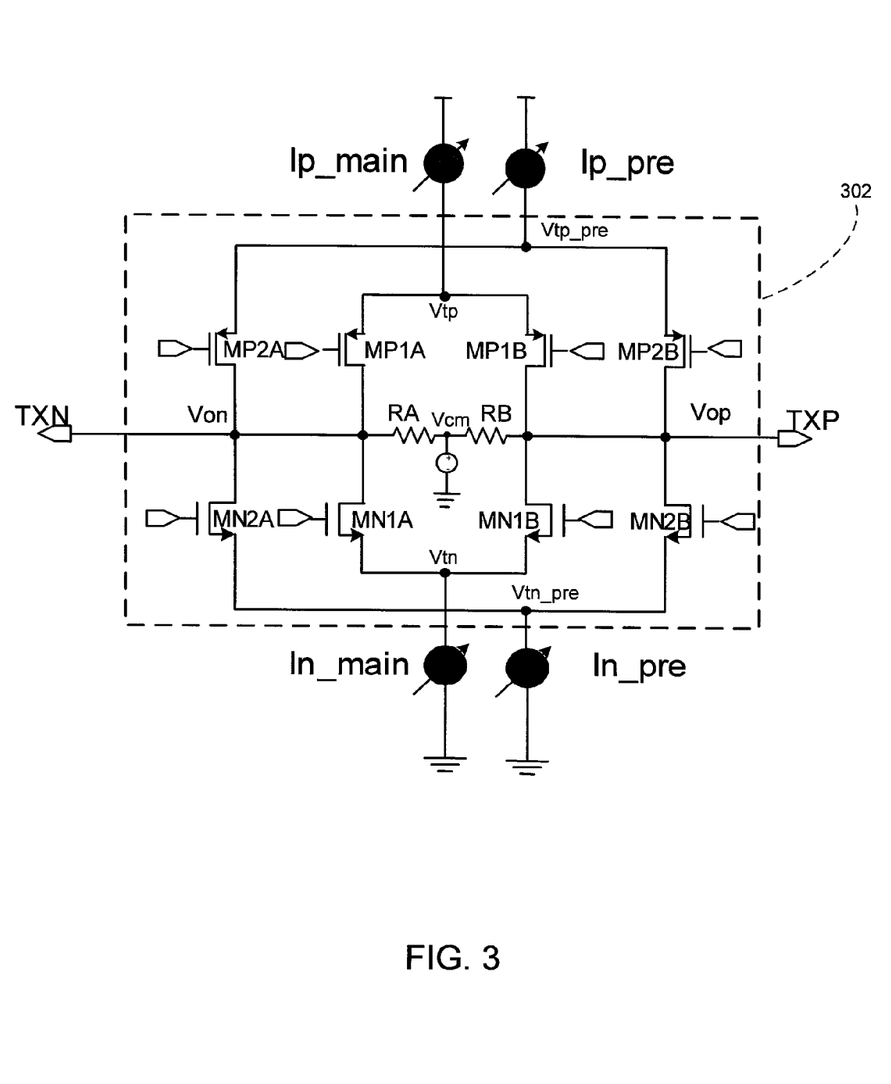
FIG. 3 is a circuit diagram of a transmitter with pre-emphasis circuitry.

FIG. 3 is a circuit diagram of a transmitter with pre-emphasis circuitry. The transmitter includes a circuit block 302 with driver switches in an H-tree buffer architecture.

A main driver circuit includes the four transistors (MP1A, MP1B, MN1A, and MN1B) and main pull-up and pull-down current drivers (Ip_main and In_main, respectively). The main pull-up current driver (Ip_main) may be connected in series between power supply voltage source (VDD) and the node Vtp. The main pull-down current driver (In_main) may be connected in series between ground and the node Vtn.

PMOS transistor MP1A and NMOS transistor MN1A are connected in series between nodes Vtp and Vtn. In particular, node Vtp is connected to the source of MP1A, the drain of MP1A is connected to the source of MN1A at node TXN, and the drain of MN1A is connected to the node Vtn.

PMOS transistor MP1B and NMOS transistor MN1B are also connected in series between nodes Vtp and Vtn. In particular, node Vtp is connected to the source of MP1B, the drain of MP1B is connected to the source of MN1B at node TXP, and the drain of MN1B is connected to the node Vtn.

Nodes Vop and Von are connected to differential outputs TXP and TXN, respectively, such that the final output signal is the differential signal (Vop−Von). Resistors RA and RB are connected in series between nodes Vop and Von. The resistances of RA and RB may be equal (RA=RB=R). Common mode voltage node Vcm is located between resistors RA and RB and may be driven by a common mode driver connected between VCM and ground.

A pre-emphasis driver circuit includes the four transistors (MP2A, MP2B, MN2A, and MN2B) and pre-emphasis pull-up and pull-down current drivers (Ip_pre and In_pre, respectively). The pre-emphasis pull-up current driver (Ip_pre) may be connected in series between power supply voltage source (VDD) and the node Vtp_pre. The pre-emphasis pull-down current driver (In_pre) may be connected in series between ground and the node Vtn_pre.

PMOS transistor MP2A and NMOS transistor MN2A are connected in series between nodes Vtp_pre and Vtn_pre. In particular, node Vtp_pre is connected to the source of MP2A, the drain of MP2A is connected to the source of MN2A at node TXN, and the drain of MN2A is connected to the node Vtn_pre.

PMOS transistor MP2B and NMOS transistor MN2B are also connected in series between nodes Vtp_pre and Vtn_pre. In particular, node Vtp_pre is connected to the source of MP2B, the drain of MP2B is connected to the source of MN2B at node TXP, and the drain of MN2B is connected to the node Vtn_pre.

Figure 4:
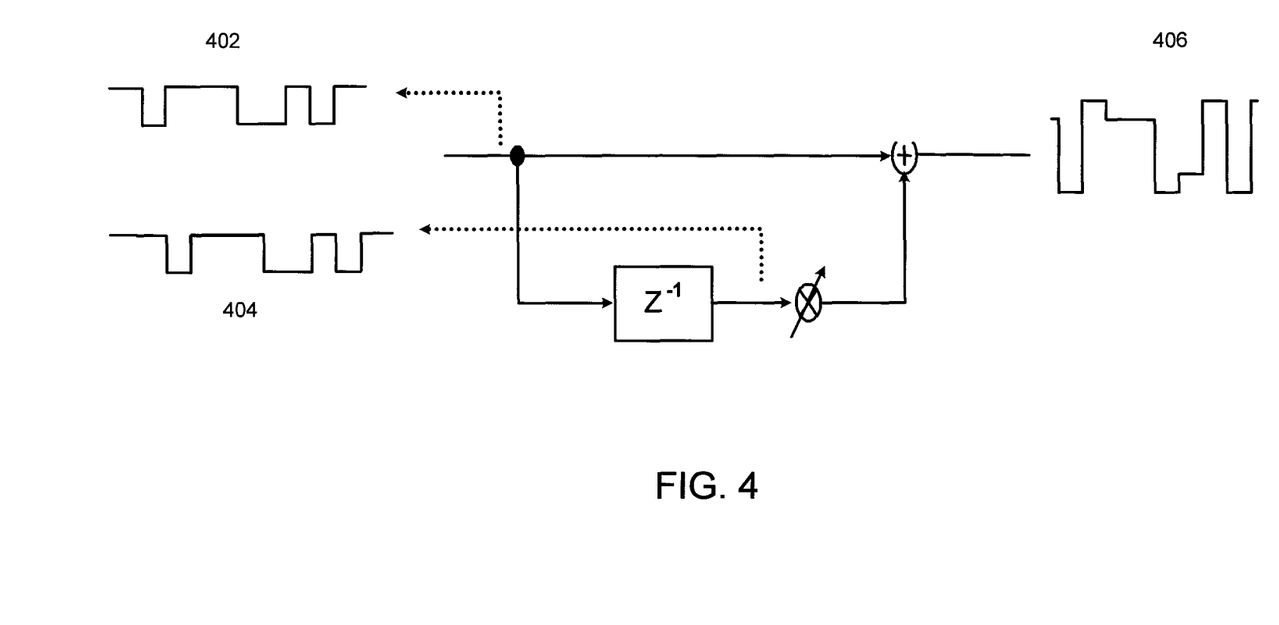
FIG. 4 is a system diagram of a transmitter with pre-emphasis circuitry.

FIG. 4 is a system diagram of a transmitter with pre-emphasis circuitry. The system diagram of FIG. 4 may be considered in view of the circuit diagram of FIG. 3. As shown, a main signal 402 is input and a pre-emphasis signal 404 is generated based on the main signal 402. In this implementation, the $Z^{-1}$ transform provides a delay such that the pre-emphasis signal 404 is slightly delayed in phase relative to the main signal 402. In other words, in this implementation, the pre-emphasis signal 404 is a post-tap signal. In an alternative implementation, the pre-emphasis signal 404 may be a pre-tap signal. The main signal 402 and a scaled version of the pre-emphasis signal 404 is added together to create the output signal 406.

Figure 5A:
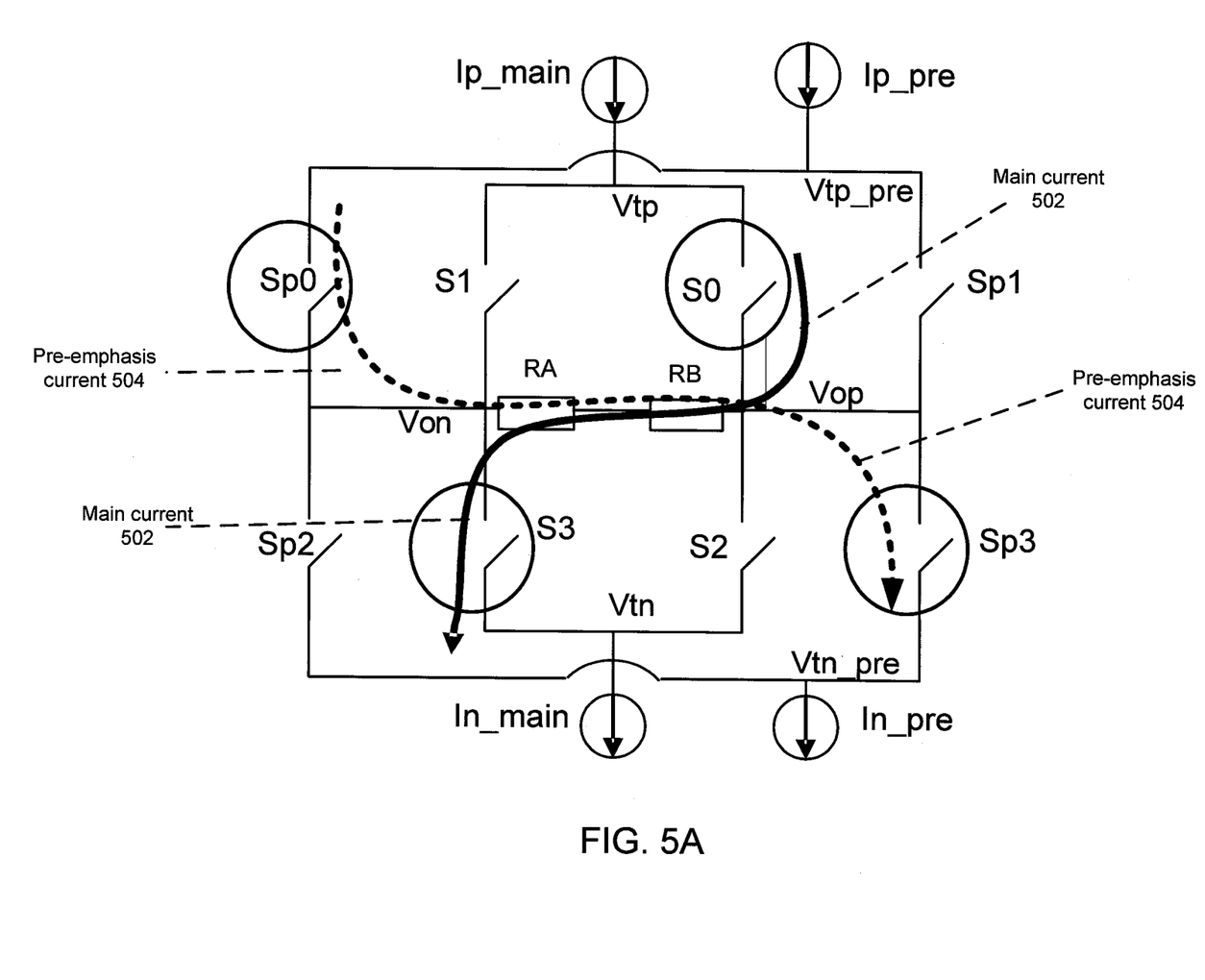
FIGS. 5A and 5B are circuit diagrams illustrating the source of the data-dependent variations that applicants have determined occur in the transmitter due to pre-emphasis switching.
Figure 5B:
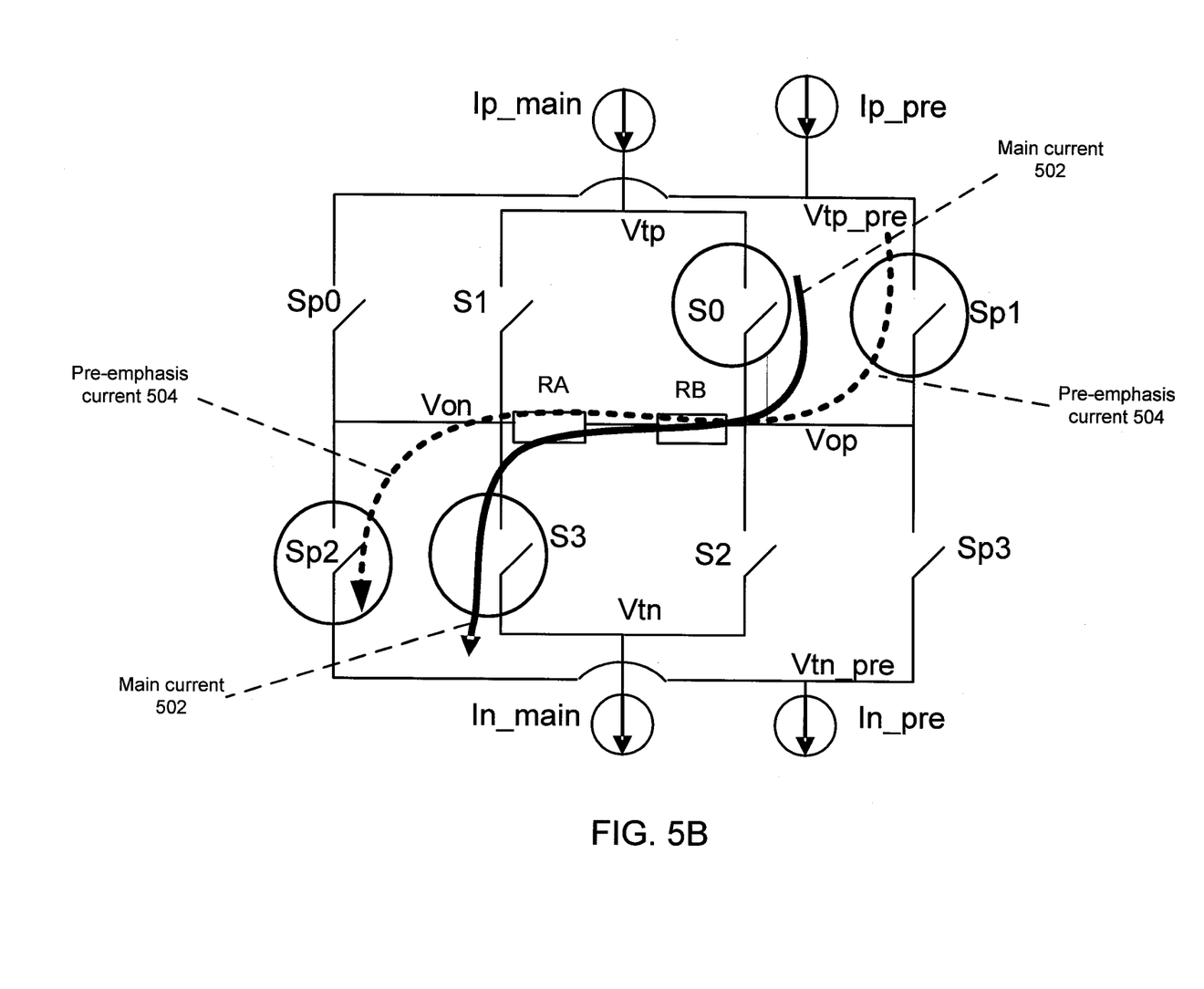

FIGS. 5A and 5B are circuit diagrams illustrating the source of the data-dependent variations that applicants have determined occur in the transmitter due to pre-emphasis switching. Output nodes Vop and Von in FIGS. 5A and 5B correspond respectively to output nodes Vop and Von in FIG. 3. Resistance 2R in FIGS. 5A and 5B corresponds to the resistors RA and RB in series in FIG. 3. The switches in FIGS. 5A and 5B correspond to the transistors in FIG. 3 as follows.

| Switch in FIGS. 5A and 5B | Transistor in FIG. 3 |
| --- | --- |
| S0 | MP1B |
| S1 | MP1A |
| S2 | MN1B |
| S3 | MN1A |
| Sp0 | MP2A |
| Sp1 | MP2B |
| Sp2 | MN2A |
| Sp3 | MN2B |

Both FIGS. 5A and 5B depict the current flow when the main switches are in the positive differential (true or 1) output state. In this state, main switches S0 and S3 are closed (conducting), and main switches S1 and S2 are not. This causes a main current 502 to flow in series through Ip_main, node Vtp, switch S0, two resistors RB and RA, switch S3, node Vtn, and In_main. Due to the current 502 flowing through the two resistors, the output voltage at node Vop is higher than the output voltage at node Von (thus generating the positive differential output).

While the main switches are configured the same in FIGS. 5A and 5B, the pre-emphasis switches are not. The pre-emphasis switches are configured to contribute a negative differential to the output in FIG. 5A, while they are configured to contribute a positive differential to the output in FIG. 5B.

In FIG. 5A, pre-emphasis switches Sp0 and Sp3 are closed (conducting), while the pre-emphasis switches Sp1 and Sp2 are open. This causes the pre-emphasis current 504 to flow in series through Ip_pre, node Vtp_pre, switch Sp0, resistors RA and RB, switch Sp3, node Vtn_pre, and In_pre. This results in the negative differential contribution to the output.

In FIG. 5B, pre-emphasis switches Sp1 and Sp2 are closed (conducting), while the pre-emphasis switches Sp0 and Sp3 are open. This causes the pre-emphasis current 504 to flow in series through Ip_pre, node Vtp_pre, switch Sp1, resistors RB and RA, switch Sp2, node Vtn_pre, and In_pre. This results in the positive differential contribution to the output.

Depending on the pre-emphasis data signal (which is a phase shifted version of the main data signal), the pre-emphasis signal may make either a positive or negative differential contribution to the output. Applicants have determined that this switching of the pre-emphasis current flow between negative and positive differential contributions that leads to the undesirable data-dependent voltage jitter in the final differential output signal. This is because the voltages on the nodes Vtp and Vtn are modulated to some degree by the direction of the pre-emphasis current flow.

In addition to determining the cause of the data-dependent voltage jitter, applicants hereby disclose filter placements to reduce or eliminate it. In accordance with an embodiment of the invention, low-pass filters may be placed at strategic points in the circuitry to suppress the voltage modulation of the current sources. The placement of the low-pass filters is depicted in FIG. 6.

Figure 6:
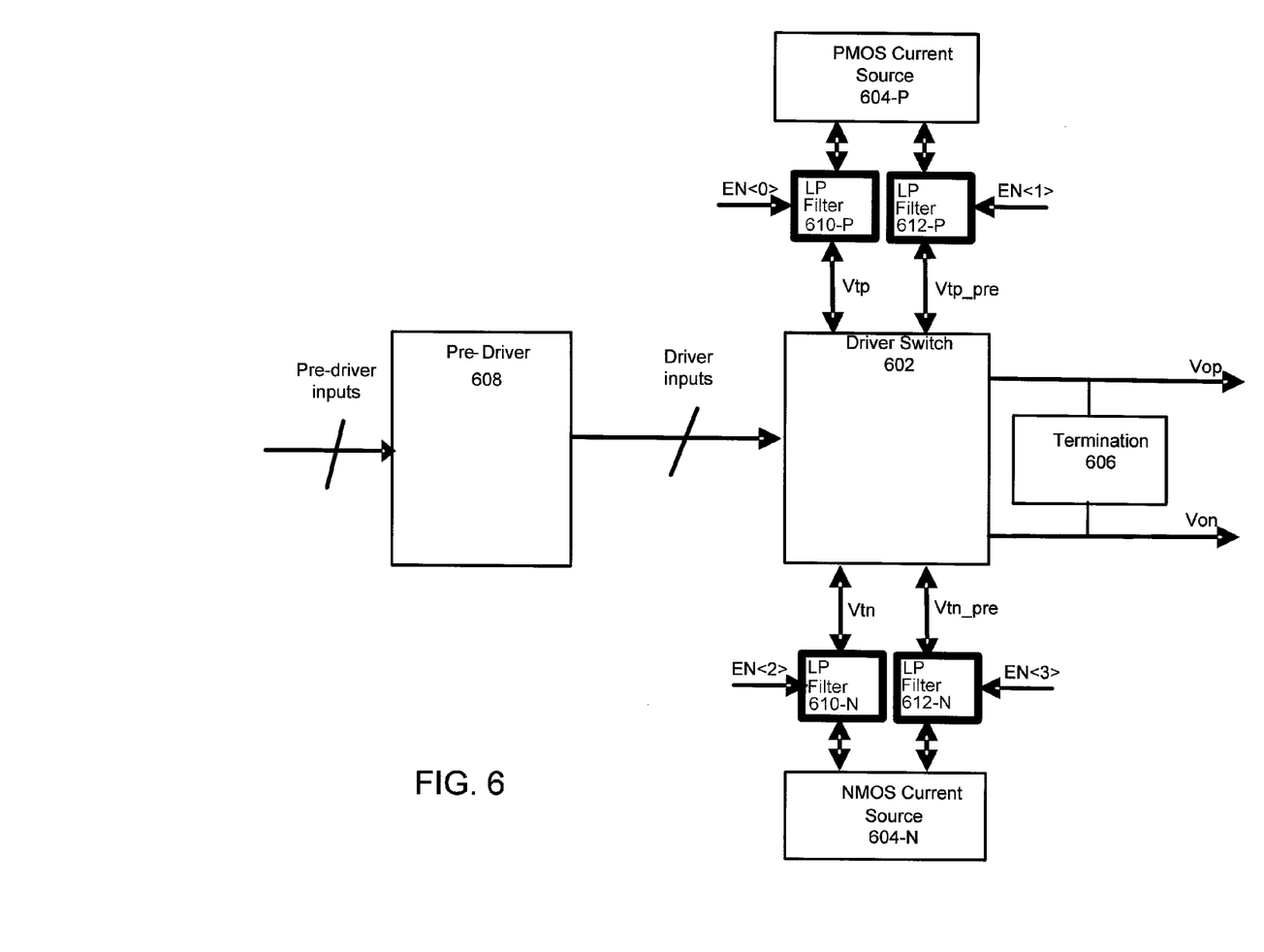
FIG. 6 is a block diagram showing filtering to suppress the modulation of current sources in accordance with an embodiment of the invention.

The driver switch block 602 in FIG. 6 corresponds to the circuit block 302 in FIG. 3. The PMOS current source 604-P in FIG. 6 is a pull-up current source which is configured to drive the current Ip_main and the current Ip_pre in FIG. 3. The NMOS current source 604-N in FIG. 6 is a pull-down current source which is configured to drive the current In_main and the current In_pre in FIG. 3.

A termination 606 is connected between the differential voltage output nodes Vop and Von. The pre-driver block 608 receives pre-driver inputs and outputs the driver inputs to the driver switch block 602. The gates of the transistors within the driver switch block 602 are driven by the driver inputs.

In accordance with an embodiment of the invention, four low-pass (LP) filters may be advantageously configured between the current sources and the driver switch. A first LP filter 610-P may be configured between the PMOS current source 604-P and the node Vtp. A second LP filter 610-N may be configured between the NMOS current source 604-N and the node Vtn. A third LP filter 612-P may be configured between the PMOS current source 604-P and the node Vtp. Finally, a fourth LP filter 612-N may be configured between the NMOS current source 604-N and the node Vtn.

Figure 7:
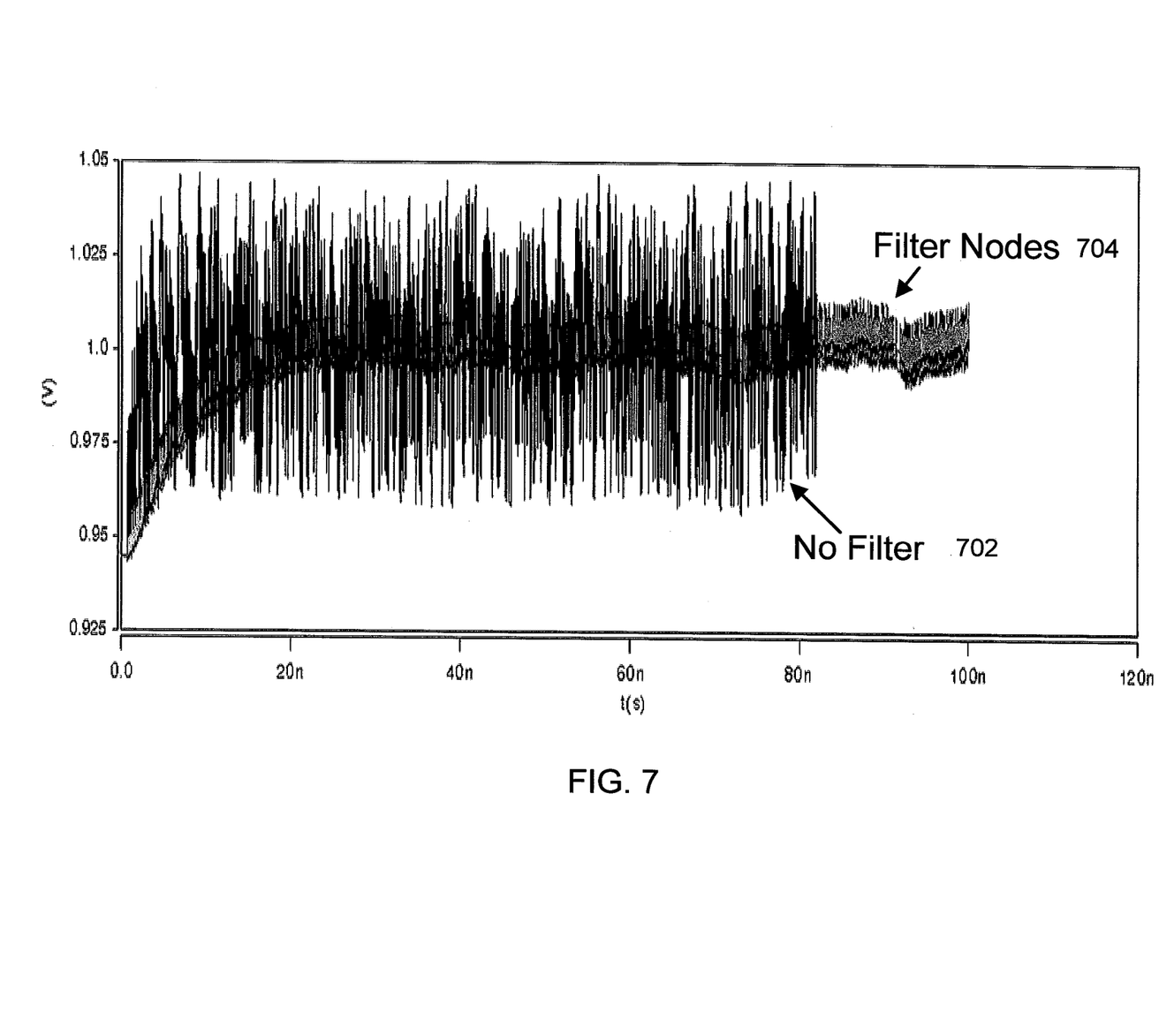
FIG. 7 is a graph of voltage versus time demonstrating the reduction in jitter noise with the filtering in place in accordance with an embodiment of the invention.

FIG. 7 is a graph of voltage versus time showing jitter noise without and with the filtering in place. The jitter noise on the Vtp nodes without filtering (No Filter) 702 is seen to be substantially reduced when filtering is in place (Filter Nodes) 704. Hence, it is seen that the LP filters (610-P, 610-N, 612-P and 612-N) placed as shown in FIG. 6 are surprisingly effective in reducing unwanted jitter.

Figure 8A:
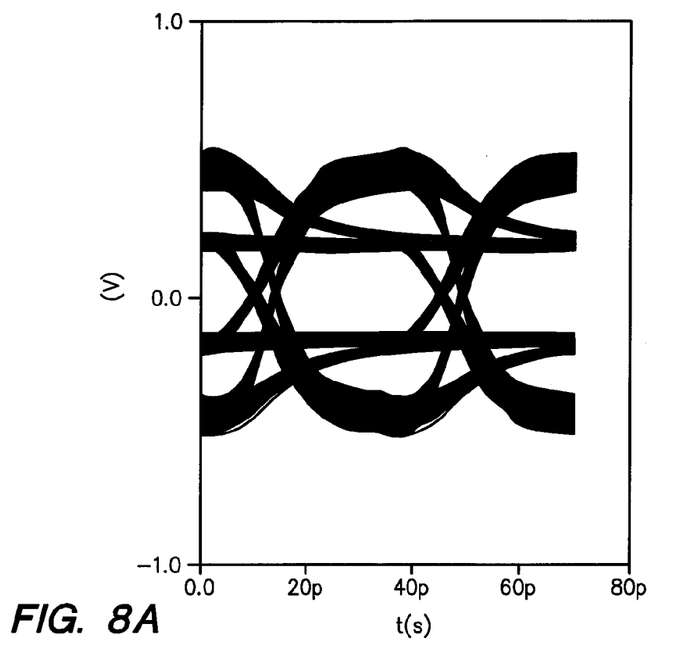
FIG. 8A is a transient eye diagram for a transmitter without the filtering in place.
Figure 8B:
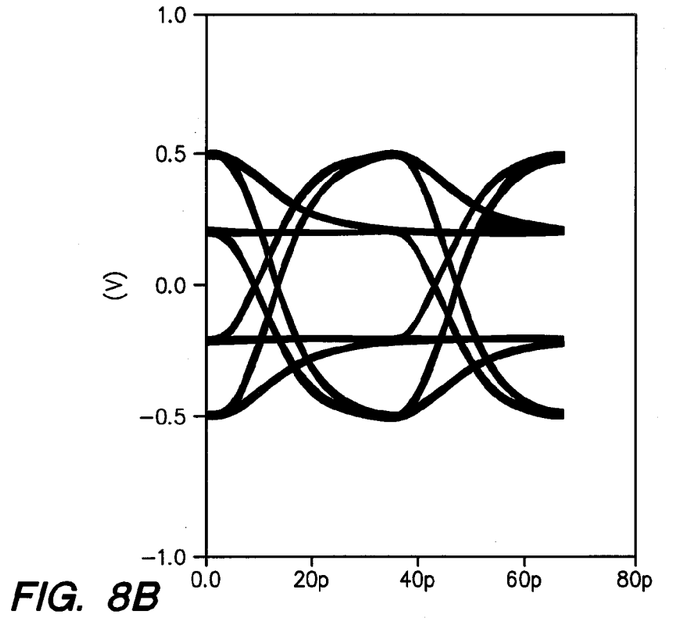
FIG. 8B is a transient eye diagram for a transmitter with the filtering in place in accordance with an embodiment of the invention.

FIG. 8A is a transient eye diagram for a transmitter without the filtering in place. In comparison, FIG. 8B is a transient eye diagram for a transmitter with the filtering in place in accordance with an embodiment of the invention. As seen, the eye diagram for the transmitter with filtering in FIG. 8B shows substantially less voltage jitter in the superimposed transitions in comparison to the eye diagram for the transmitter without filtering in FIG. 8A. This much reduced level of transmitter voltage jitter is a surprising result from the strategic insertion of the LP filters shown in FIG. 6. Referring to FIGS. 1 and 2, this reduction of voltage jitter at the transmitter will translate to a corresponding reduction in voltage jitter and a substantially increased eye opening at the receiver.

Figure 9:
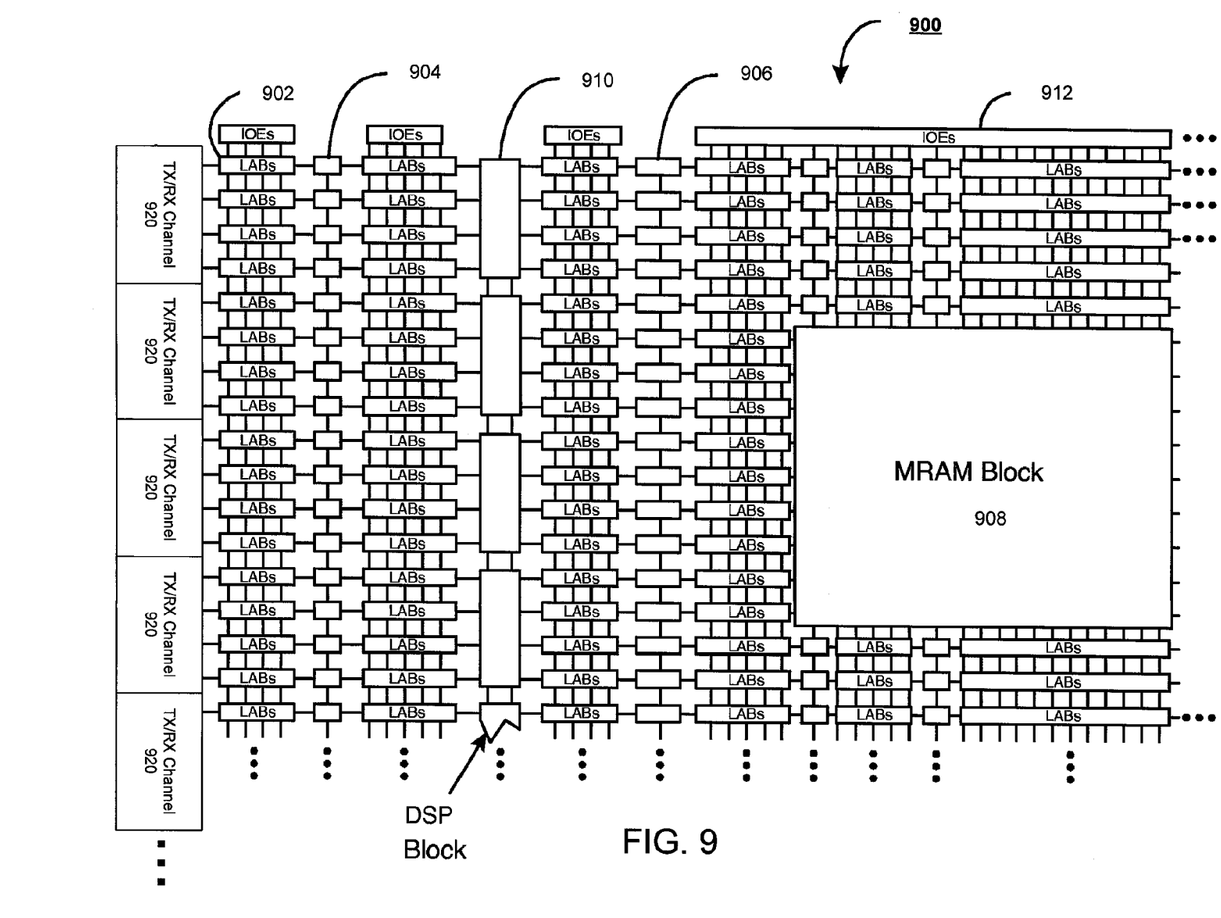
FIG. 9 is a simplified partial block diagram of a field programmable gate array (FPGA) that may be configured to implement an embodiment of the present invention.

FIG. 9 is a simplified partial block diagram of a field programmable gate array (FPGA) 900 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 900 includes within its "core" a two-dimensional array of programmable logic array blocks (or LABs) 902 that are interconnected by a network of column and row interconnect conductors of varying length and speed. LABs 902 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 900 may also include a distributed memory structure including random access memory (RAM) blocks of varying sizes provided throughout the array. The RAM blocks include, for example, blocks 904, blocks 906, and block 908. These memory blocks can also include shift registers and FIFO buffers.

FPGA 900 may further include digital signal processing (DSP) blocks 910 that can implement, for example, multipliers with add or subtract features. Input/output elements (IOEs) 912 located, in this example, around the periphery of the chip support numerous single-ended and differential input/output standards. Each IOE 912 is coupled to an external terminal (i.e., a pin) of FPGA 900. A transceiver (TX/RX) channel array may be arranged as shown, for example, with each TX/RX channel circuit 920 being coupled to several LABs. A TX/RX channel circuit 920 may include, among other circuitry, the transmitter circuitry described herein.

It is to be understood that FPGA 900 is described herein for illustrative purposes only and that the present invention can be implemented in many different types of PLDs, FPGAs, and ASICs.

Figure 10:
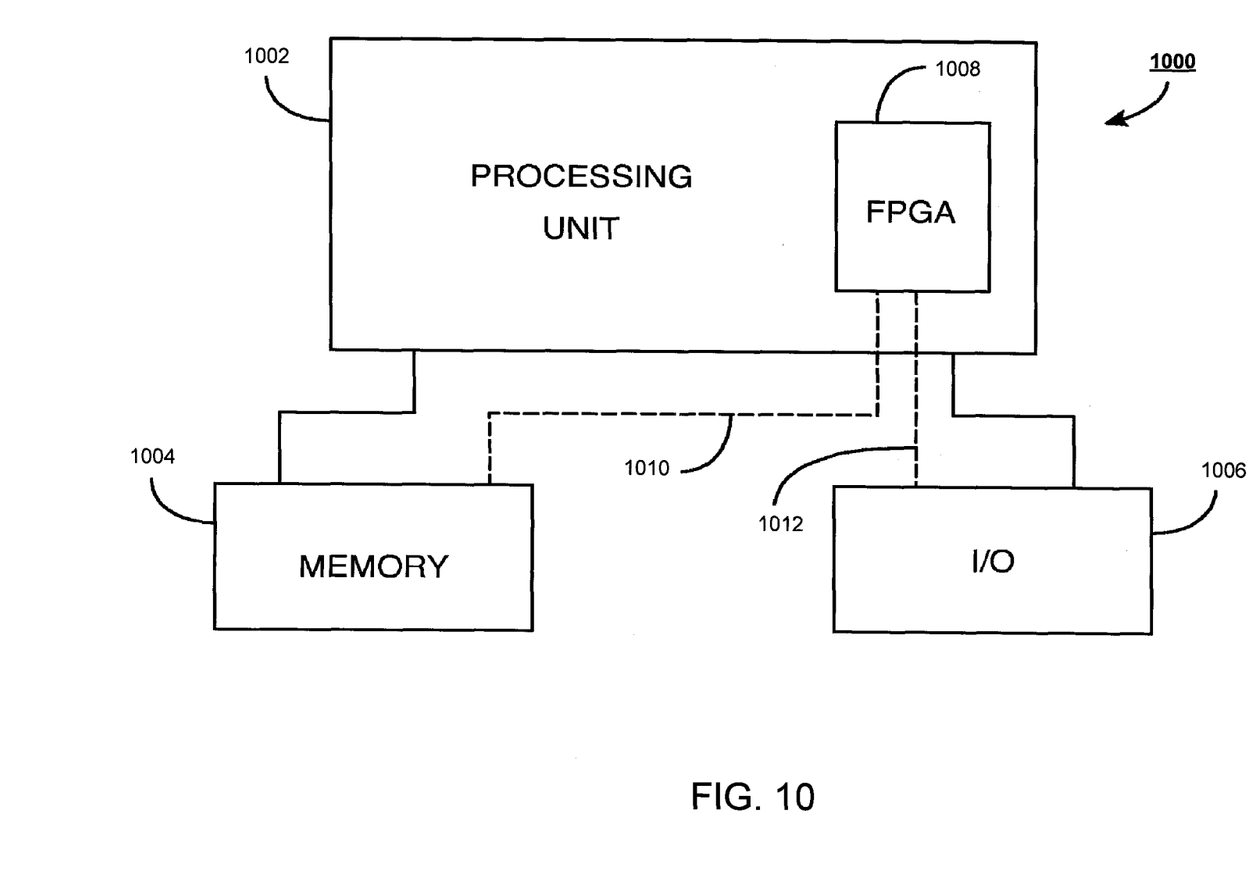
FIG. 10 shows a block diagram of an exemplary digital system that may be configured to utilize an embodiment of the present invention.

The present invention can also be implemented in a system that has a FPGA as one of several components. FIG. 10 shows a block diagram of an exemplary digital system 1000 that can embody techniques of the present invention. System 1000 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 1000 may be provided on a single board, on multiple boards, or within multiple enclosures.

System 1000 includes a processing unit 1002, a memory unit 1004, and an input/output (I/O) unit 1006 interconnected together by one or more buses. According to this exemplary embodiment, FPGA 1008 is embedded in processing unit 1002. FPGA 1008 can serve many different purposes within the system 1000. FPGA 1008 can, for example, be a logical building block of processing unit 1002, supporting its internal and external operations. FPGA 1008 is programmed to implement the logical functions necessary to carry on its particular role in system operation. FPGA 1008 can be specially coupled to memory 1004 through connection 1010 and to I/O unit 1006 through connection 1012.

Processing unit 1002 may direct data to an appropriate system component for processing or storage, execute a program stored in memory 1004, receive and transmit data via I/O unit 1006, or other similar function. Processing unit 1002 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 1008 may control the logical operations of the system. As another example, FPGA 1008 acts as a reconfigurable processor that may be reprogrammed as needed to handle a particular computing task. Alternately, FPGA 1008 may itself include an embedded microprocessor. Memory unit 1004 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A transmitter circuit comprising:
   a first current source, wherein the first current source comprises a pull-up current source;
   a first filter coupled between the first current source and a first node
   a second filter coupled between the first current source and a second node;
   a second current source, wherein the second current source comprises a pull-down current source;
   a third filter coupled between the second current source and a third node;
   a fourth filter coupled between the second current source and a fourth node; and
   a driver switch circuit coupled to the first, second, third and fourth nodes, wherein the driver switch circuit comprises a main driver circuit connected to the first and third nodes and a pre-emphasis driver circuit connected to the second and fourth nodes.

2. The transmitter circuit of claim 1, wherein the first, second, third, and fourth filters each comprise a low-pass filter.

3. The transmitter circuit of claim 1, wherein the pull-up current source comprises a PMOS current source, and wherein the pull-down current source comprises an NMOS current source.

4. The transmitter circuit of claim 1, wherein the main driver circuit is configured to receive a digital data signal, and wherein the pre-emphasis driver circuit is configured to receive a pre-emphasis signal which is a phase shifted and scaled version of the digital input signal.

5. The transmitter circuit of claim 4, wherein the driver switch circuit is configured to add the pre-emphasis signal to the digital data signal and output a resulting signal.

6. The transmitter circuit of claim 1, wherein the main driver circuit comprises:
   first and second transistors connected in series between the first and third nodes;
   a first output node between the first and second transistors;
   third and fourth transistors connected in series between the first and third nodes;
   a second output node between the third and fourth transistors; and
   a resistance connected between the first and second output nodes.

7. The transmitter circuit of claim 6, wherein the pre-emphasis driver circuit comprises:
   fifth and sixth transistors connected in series between the second and fourth nodes, wherein in the first output node is connected between the fifth and sixth transistors; and
   seventh and eighth transistors connected in series between the second and fourth nodes, wherein the second output node is connected between the seventh and eight transistors.

8. The transmitter circuit of claim 7, wherein the resistance comprises:
   first and second resistors connected in series between the first and second output nodes; and
   a common-mode voltage node between the first and second resistors.

9. The transmitter circuit of claim 8, further comprising a common-mode voltage source connected between the common-mode voltage node and ground.

10. The transmitter circuit of claim 7, wherein the first, third, fifth and seventh transistors are PMOS transistors, and wherein the second, fourth, sixth and eighth transistors are NMOS transistors.

11. A method of driving a transmission signal with pre-emphasis having minimal voltage jitter, the method comprising:
    receiving a digital data signal;
    generating a pre-emphasis signal which is a phase shifted and scaled version of the digital data signal;
    inputting the digital data signal and the pre-emphasis signal to a driver switch circuit;
    applying low-pass filtering to current sources for the driver switch circuit; and
    generating an output signal by adding the pre-emphasis signal to the digital data signal in the driver switch circuit.

12. The method of claim 11, wherein the current sources comprise a pull-up current source and a pull-down current source, and wherein the low-pass filtering is applied by a first low-pass filter connected between the pull-up current source and the driver switch circuit, a second low-pass filter connected between the pull-down current source and the driver switch circuit, a third low-pass filter connected between the pull-up current source and the driver switch circuit, and a fourth low-pass filter connected between the pull-down current source and the driver switch circuit.

13. The method of claim 12, wherein the driver switch circuit comprises a main driver circuit connected to the first and third nodes and a pre-emphasis driver circuit connected to the second and fourth nodes.

14. The method of claim 13, wherein the main driver circuit comprises:
    first and second transistors connected in series between the first and third nodes;
    a first output node between the first and second transistors;
    third and fourth transistors connected in series between the first and third nodes;
    a second output node between the third and fourth transistors; and
    a resistance connected between the first and second output nodes.

15. The method of claim 14, wherein the pre-emphasis driver circuit comprises:
   fifth and sixth transistors connected in series between the second and fourth nodes, wherein in the first output node is connected between the fifth and sixth transistors; and
   seventh and eighth transistors connected in series between the second and fourth nodes, wherein the second output node is connected between the seventh and eight transistors.

16. The method of claim 15, wherein the resistance comprises:
   first and second resistors connected in series between the first and second output nodes; and
   a common-mode voltage node between the first and second resistors.

17. An integrated circuit comprising:
   a transmitter which is configured to receive a digital data signal and generate a pre-emphasis signal which is a phase shifted and scaled version of the digital data signal;
   a driver switch circuit for the transmitter which is configured to add the pre-emphasis signal to the digital data signal so as to generate an output signal; and
   a plurality of low-pass filters connected between current sources and the driver switch.

18. The integrated circuit of claim 17, wherein the integrated circuit comprises a field-programmable gate array which includes a plurality of programmable logic array blocks, and wherein the transmitter is included as part of a transceiver channel circuit which is coupled to the plurality of programmable logic array blocks.

* * * * *